United States Patent [19]
Cavagna

[11] Patent Number: 6,071,034
[45] Date of Patent: Jun. 6, 2000

[54] QUICK-COUPLING DEVICE, PARTICULARLY FOR APPLYING A COVER TO WATER CLOSET

[75] Inventor: Livio Cavagna, Lumezzane, Italy

[73] Assignee: Sipex S.n.c. di Cavagna Livio & C., Lumezzane S.S., Italy

[21] Appl. No.: 09/008,556

[22] Filed: Jan. 16, 1998

[30] Foreign Application Priority Data

Jan. 21, 1997 [IT] Italy .................................. MI97A0110

[51] Int. Cl.[7] ...................................................... F16B 9/02
[52] U.S. Cl. ............................. 403/319; 403/315; 4/236; 4/240
[58] Field of Search .................................... 403/315, 316, 403/317, 318, 319, 154, 155, 114, 115, 348, 349; 16/265, 266, 261, 263; 4/236, 234, 240, 237

[56] References Cited

U.S. PATENT DOCUMENTS

| | | |
|---|---|---|
| 2,672,623 | 3/1954 | Sperzel . |
| 3,471,874 | 10/1969 | Dixon ........................................... 4/240 |
| 4,079,471 | 3/1978 | Corda ........................................... 4/240 |
| 4,133,061 | 1/1979 | Hurd ............................................ 4/236 |
| 4,309,780 | 1/1982 | Fantetti ........................................ 4/234 |
| 4,326,307 | 4/1982 | Baillie et al. . |
| 4,697,948 | 10/1987 | Fukuda ................................. 403/155 X |
| 4,725,029 | 2/1988 | Herve ................................... 403/348 X |

FOREIGN PATENT DOCUMENTS

| | | |
|---|---|---|
| 503 749 | 6/1951 | Belgium . |
| 2475878 | 8/1981 | France ........................................ 4/236 |
| 27 00 663 | 7/1978 | Germany . |
| 44 09 516 | 9/1994 | Germany . |
| 9115984 | 10/1991 | WIPO ........................................ 2/240 |

*Primary Examiner*—Harry C. Kim
*Attorney, Agent, or Firm*—Guido Modiano; Albert Josif; Daniel O'Byrne

[57] ABSTRACT

A quick-coupling device, for applying a cover to a water closet, including: pin elements which are fixable to the water closet; shaped heads each provided at an end of a body part of each one of the pin elements; a cross-member having a linear longitudinal extension for joining a seat and a lid of the cover; seats mutually distally arranged on the cross-member and having a shape adapted to be engageable by the shaped heads of each of the pin elements; and a locking device for detachably locking the shaped heads of the pin elements in the seats. The locking device includes sliders which are slidably movable on the cross-member in the direction of the linear longitudinal extension of the cross-member between a locking position in which the sliders engage the shaped heads of the pin elements for locking the shaped heads in the seats of the cross-member, and a non-locking position in which the sliders are arranged distally and non-engaging with the shaped heads so that the shaped heads may be inserted into and removed from the seats.

19 Claims, 5 Drawing Sheets

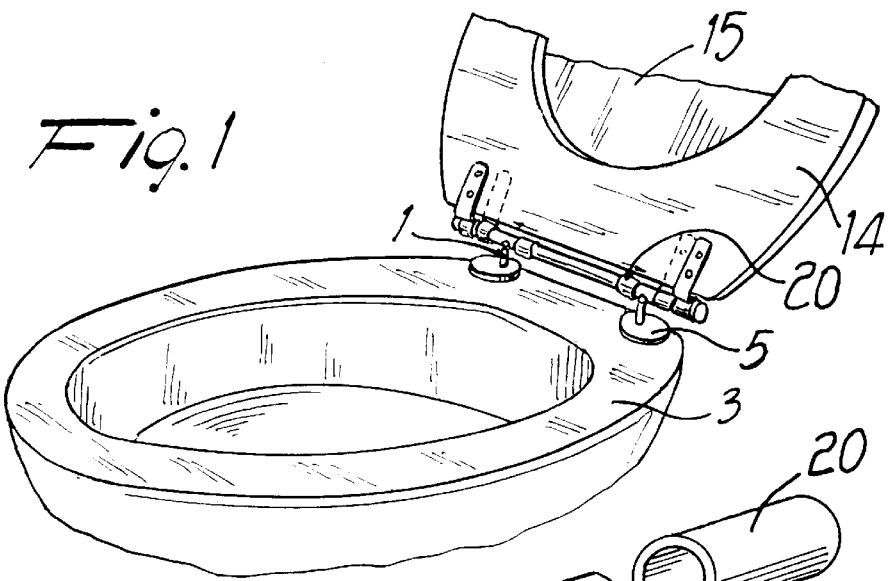
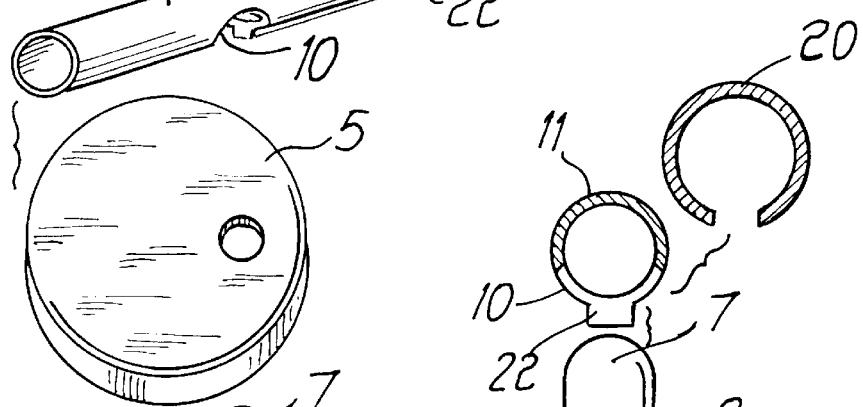
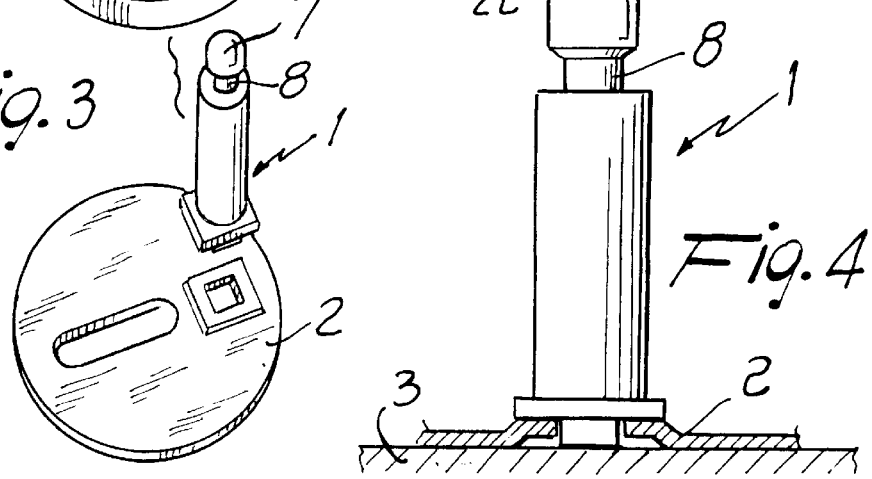

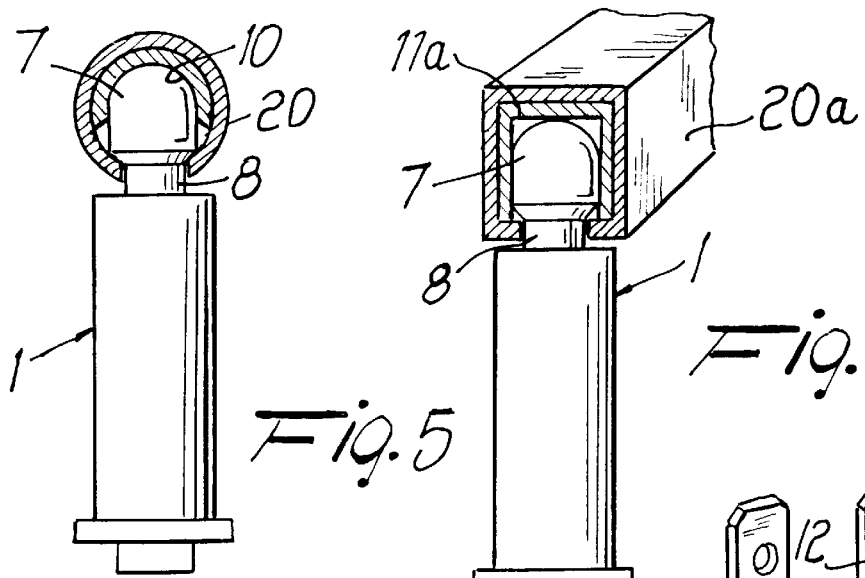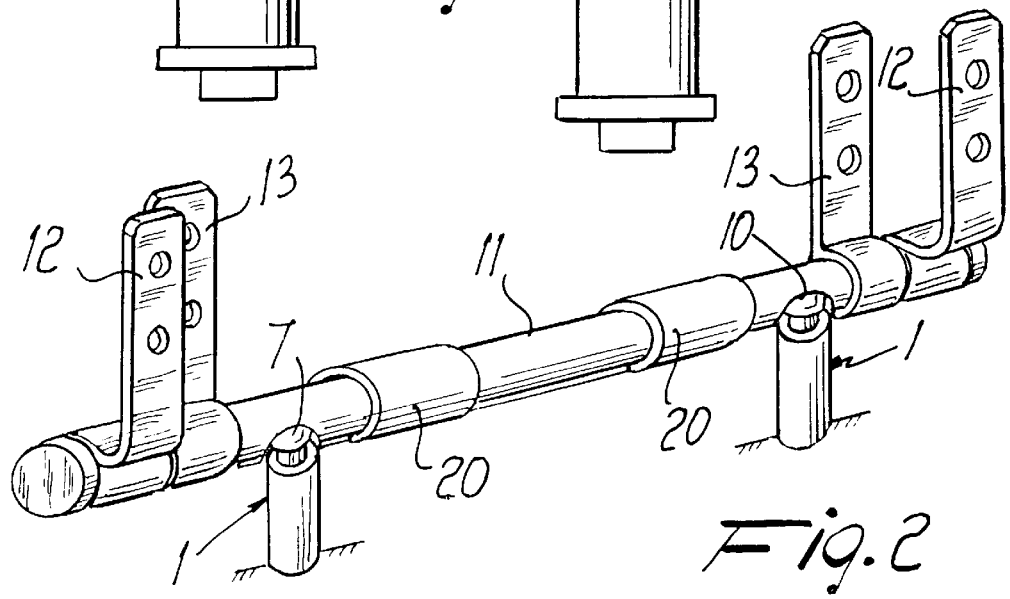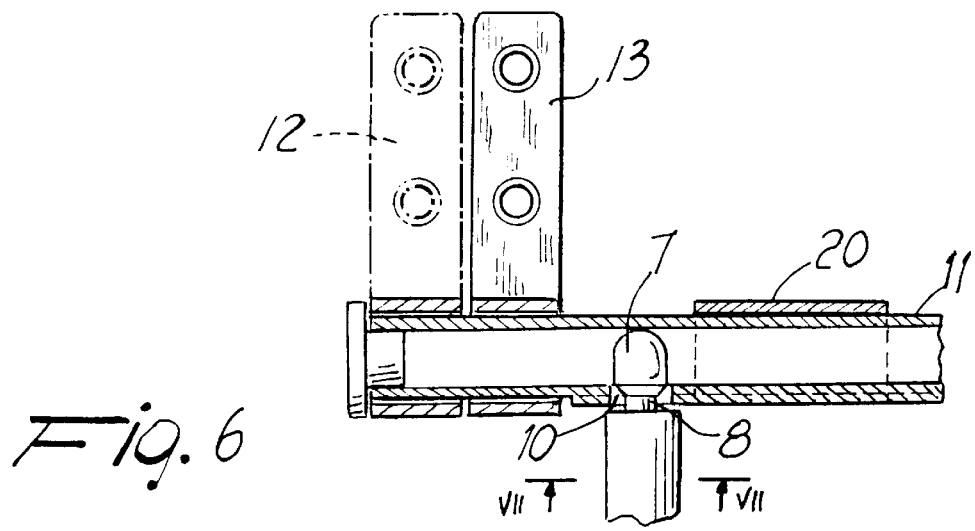

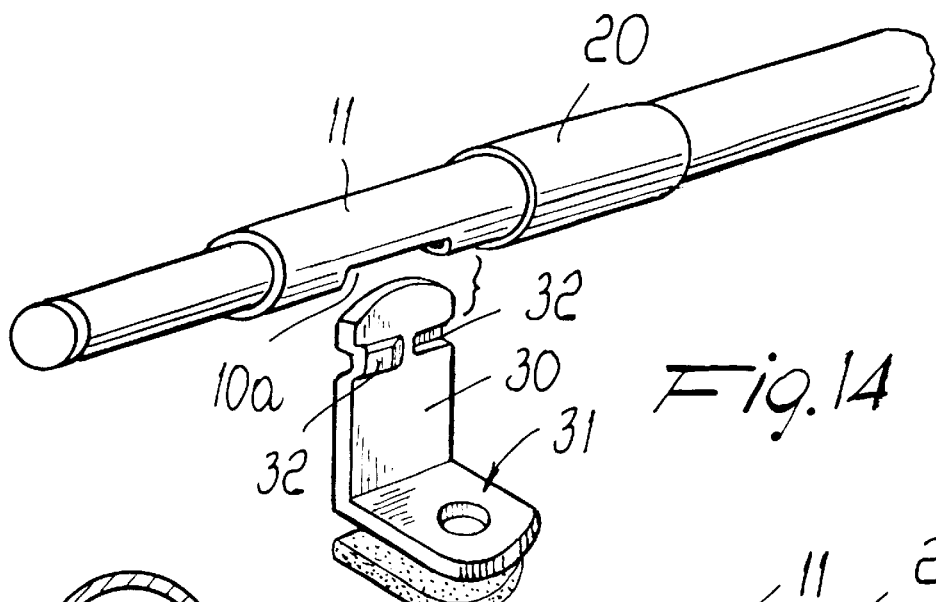
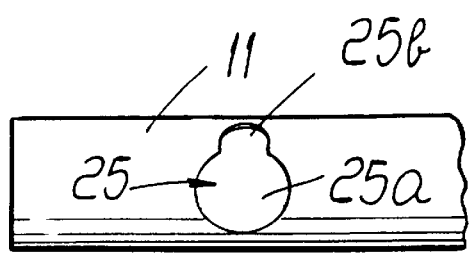
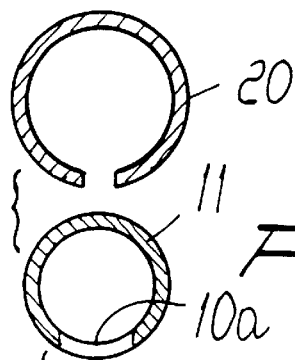
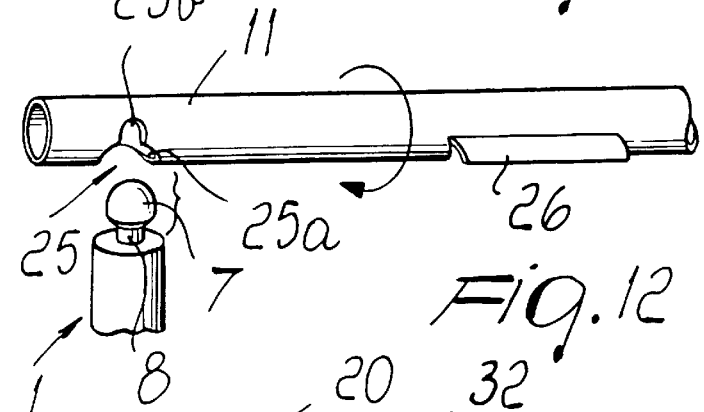
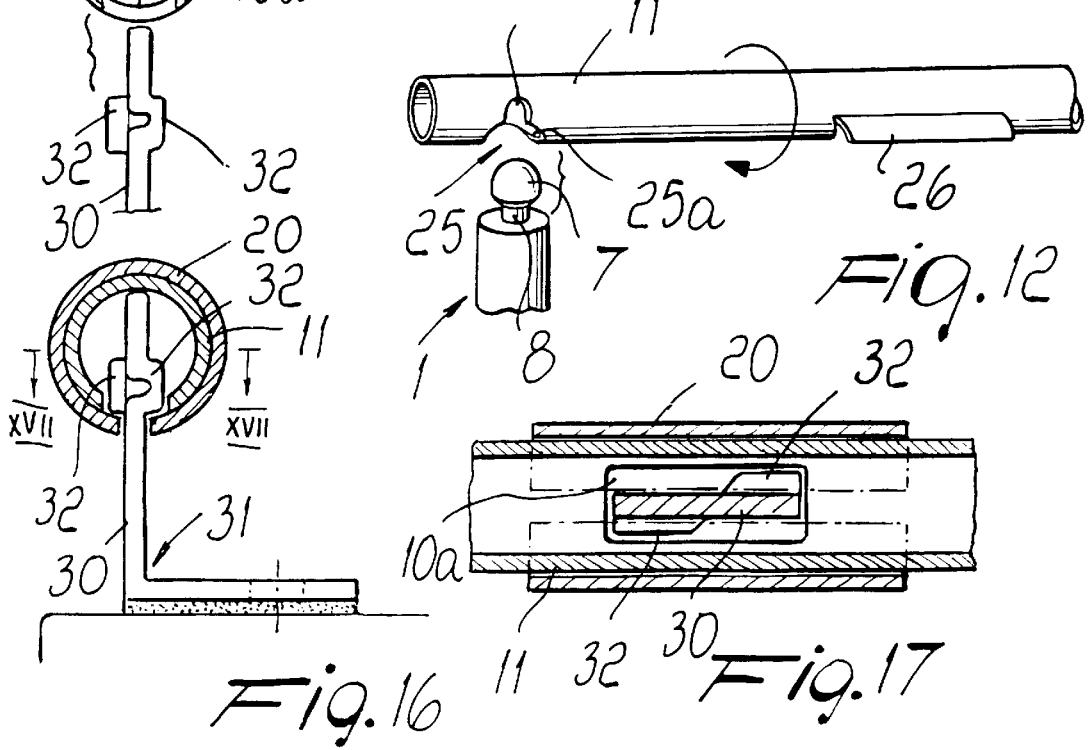

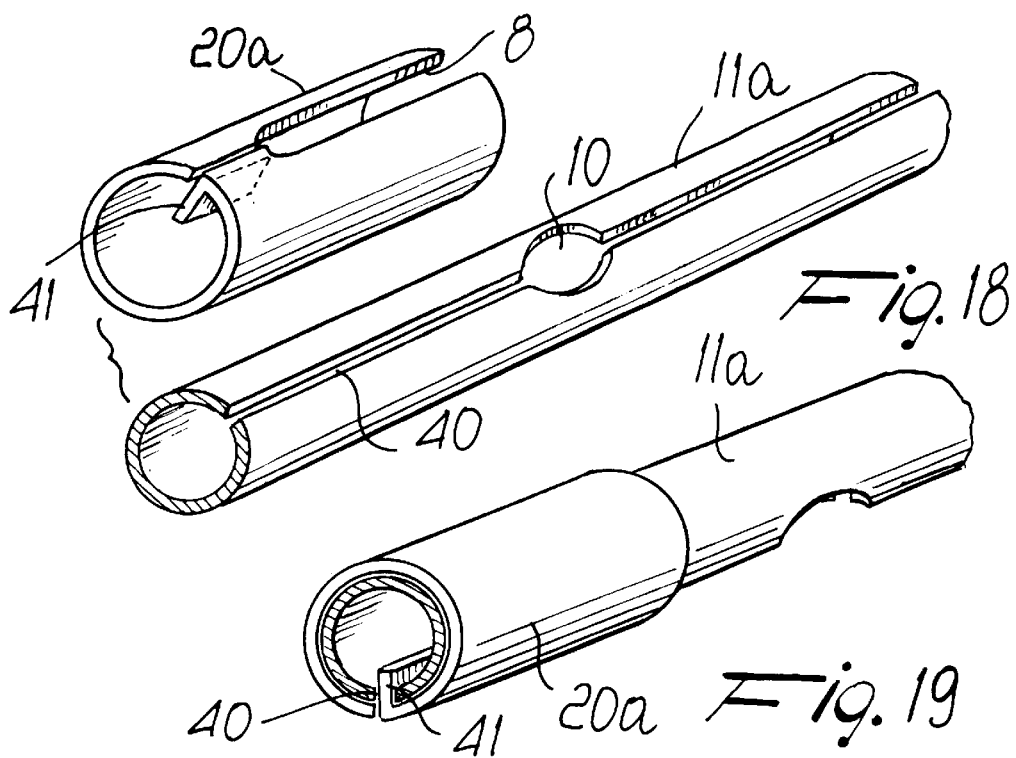
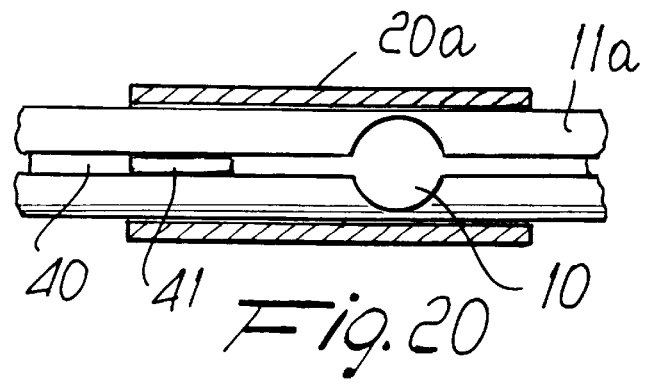
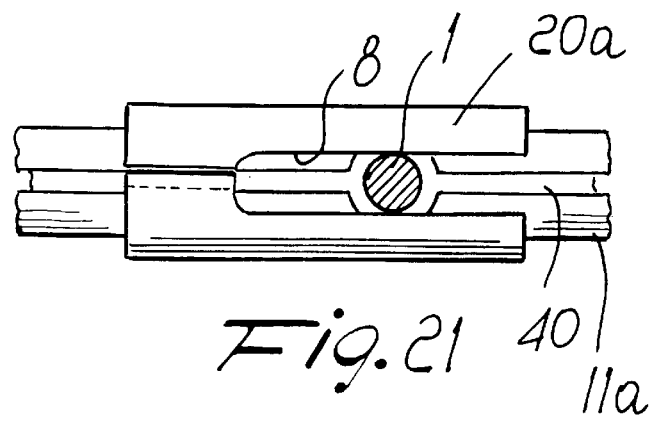

QUICK-COUPLING DEVICE, PARTICULARLY FOR APPLYING A COVER TO WATER CLOSET

BACKGROUND OF THE INVENTION

The present invention relates to a quick-coupling device, particularly for applying a cover to a water closet.

It is known that the cover of a water closet or toilet bowl is currently connected by using threaded bolts which pass through holes provided for this purpose on the edge of the water closet and are tightened by threaded bushes, wing nuts or the like.

The bush engages the lower edge of the water closet and thus applies a traction which keeps the cover in contact with the water closet in a stable position.

This solution, which allows to stably fix the cover to the water closet, however entails the drawback that it does not allow to rapidly remove the cover from the closet, since in order to remove the cover it is necessary to act on the threaded bolt to remove the previously described coupling.

It is evident that this method does not allow to perform thorough cleaning, since it is practically impossible to remove the cover from the water closet every time by acting on the threaded means.

This limitation is particularly felt in all public premises, such as hospitals, bars, hotels and so forth, where it would be necessary to frequently and quickly clean the water closet cover entirely and possibly sterilize it.

SUMMARY OF THE INVENTION

The aim of the present invention is to solve the above problem, by providing a quick coupling device, particularly for applying a cover to a water closet, which allows to have a stable and safe connection of the cover although it is possible to separate the cover from the water closet with a very quick and simple operation that does not require action on the threaded bolts.

Within the scope of this aim, a particular object of the invention is to provide a quick-coupling device which allows to perform coupling to the water closet and optional separation without having to resort to the use of tools of any kind.

Another object of the present invention is to provide a coupling device which can be easily applied to any kind of water closet cover, always giving the greatest assurances of reliability and safety in use.

Another object of the present invention is to provide a quick-coupling device which can be easily obtained starting from commonly commercially available elements and materials and is also competitive from a merely economical point of view.

This aim, these objects, and others which will become apparent hereinafter are achieved by a quick-coupling device, particularly for applying a cover to a water closet, according to the invention, characterized in that it comprises pin elements which can be fixed to a water closet and are provided with a shaped head which can be detachably inserted in corresponding seats formed on a cross-member for joining the seat and the lid of the cover, means for detachably locking said head in said seats being also provided.

BRIEF DESCRIPTION OF THE DRAWINGS

Further characteristics and advantages of the present invention will become apparent from the description of a preferred but not exclusive embodiment of a quick-coupling device, particularly for applying a cover to a water closet, illustrated only by way of non-limitative example in the accompanying drawings, wherein:

FIG. 1 is a schematic perspective view of the coupling device according to the invention, applied to a water closet;

FIG. 2 is a perspective view of the coupling device;

FIG. 3 is an exploded perspective view of the pin with the shaped head and of the cross-member that forms the seat and the locking element;

FIG. 4 is a partially sectional exploded view of the locking pin with the cross-member forming the seat;

FIG. 5 is a sectional view of the coupling between the cross-member and the pin;

FIG. 6 is a longitudinal sectional view of the coupling between the pin and the cross-member;

FIG. 9 is a schematic view of a different embodiment, wherein th cross-member has a square configuration;

FIG. 12 is a view of a different embodiment, wherein the locking elements are integrated within the cross-member;

FIG. 13 is a view of the slotted seat formed on the cross-member to achieve locking;

FIG. 14 is an exploded perspective view of a different embodiment, wherein the pin element is plate-shaped;

FIG. 15 is a sectional exploded view of the coupling elements;

FIG. 16 is a sectional view of the coupling between the plate-shaped pin element and the cross-member;

FIG. 17 is a sectional view, taken along the plane XVII—XVII of FIG. 16;

FIG. 18 is an exploded perspective view of means for preventing he rotation of the slider with respect to the cross-member;

FIG. 19 is a perspective view of the means of FIG. 18;

FIG. 20 is a view of the means of FIG. 18, with the slider shown in cross-section; and FIG. 21 is a sectional view taken at the coupling pin.

DISCRIPTION OF THE PREFERRED EMBODIMENTS

Figure 7:
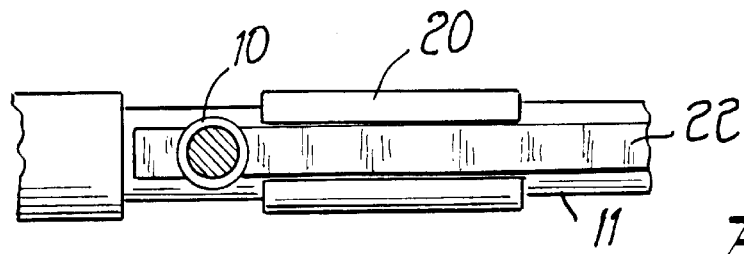
FIGS. 7 and 8 are sectional views, taken along the plane VII—VII of FIG. 6, wherein the locking element is respectively in the disengagement position and in the engagement position.
Figure 8:
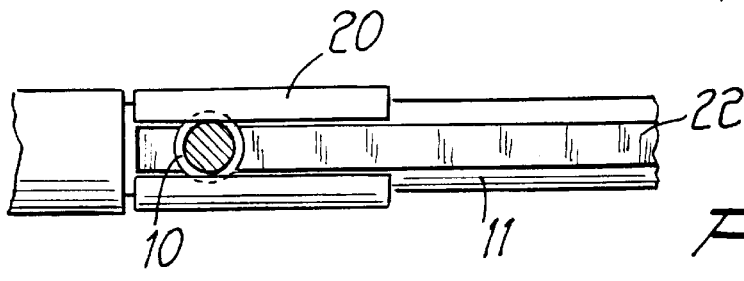

With reference to the above figures, the quick-coupling device, particularly for applying a cover to a water closet, according to the invention, comprises a pin element, generally designated by the reference numeral 1, which is rigidly coupled to a fixing plate 2 which can be connected, in a per se known manner, to a water closet 3 by means of the conventional fixing bolts which rigidly connect it to the water closet. There is also provided a covering disk 5, from which the pin 1 protrudes. The pin can optionally be integrated directly in the threaded bolt and other fixings are likewise possible.

The pin 1 ends with a shaped head 7 which is separated by a tapering groove 8 from the remaining part of the pin 1.

The shaped head 7 can be inserted in seats 10 correspondingly provided on a cross-member 11, which supports the hinges 12 and 13 for respectively connecting the seat 14 and the lid 15 or in any case joins the seat and the lid to each other so that they can rotate with respect to each other.

The shaped head 7 enters the seats by simple insertion and can be locked by means of locking elements constituted by sliders 20 which enter the groove 8 of the shaped head and thus prevent disengagement.

In order to perform disengagement it is sufficient to shift the sliders 20, accordingly releasing the shaped head, which allows the disengagement of the cover from the water closet.

In practice, the sliders 20 are provided by means of tubular elements having a slot that allows insertion in the tapering groove 8.

In order to prevent the sliders 20 from rotating with respect to the cross-member, there is provided a radial ridge 22 or there are provided other spaced elements which, by fitting between the open flaps of the slider 20, prevent its rotation.

Optionally, as shown schematically in FIG. 9, it is possible to provide a cross-member, designated by the reference numeral 11a, which has a substantially square or polygonal shape or is otherwise shaped so as to prevent the rotation of the slider; likewise, the slider 20a has a complementary shape without requiring guiding ridges, since rotation is in any case prevented.

According to FIGS. 12 and 13, it is possible to directly integrate the locking elements in the cross-member;

it is in fact possible to provide on the cross-member slotted seats 25 having a wider portion 25a and a narrower portion 25b and arranged circumferentially on the cross-member.

The end of the pin enters the wider portion but is smaller than the narrower portion, so that by turning the cross-member, by means of the optional protrusion 26b, said cross-member is coupled to the pin.

Figure 10:
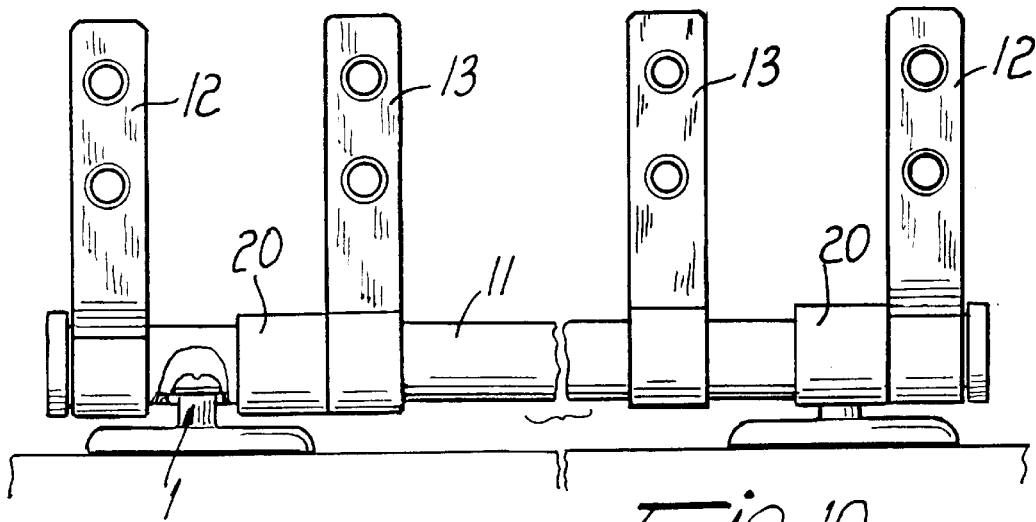
FIG. 10 is a view of a quick-coupling device wherein the locking elements are arranged between the hinges for connecting the seat to the lid.
Figure 11:
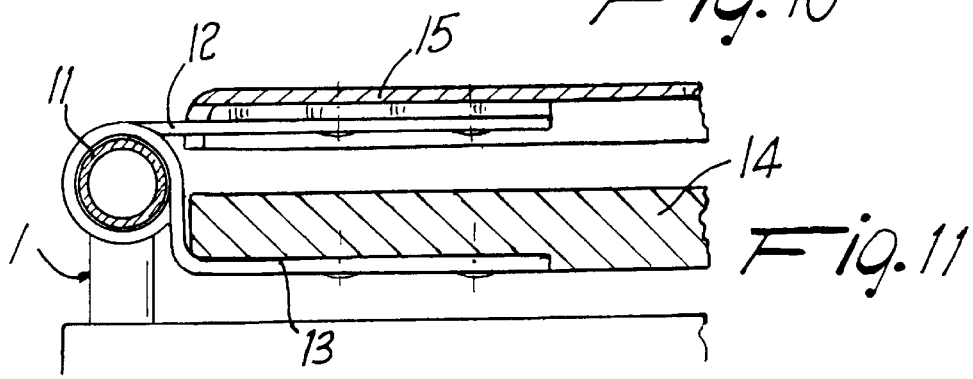
FIG. 11 is a schematic transverse sectional view of the cover, applied to the cross-member and connected to the pins.

In the example described in FIGS. 1 to 9, the sliders are arranged inside the region delimited by the hinges 12 and 13, which are arranged side by side; optionally, as shown in the embodiment of FIG. 10, it is possible to provide the hinges, again designated by the reference numerals 12 and 13, so that they are spaced from one another, and the slider 20 can be arranged in the region delimited between the hinges.

As shown in FIGS. 14 to 17, the pin elements can have a plate-like shape, designated by the reference numeral 30, which is advantageously provided by an L-shaped bracket 31 which can be fixed in a per se known manner to the water closet.

At the shaped end on the plate 30 there are provided protrusions 32 which are preferably arranged opposite to each other and can be inserted in shaped seats, designated by the reference numeral 10a, which allow to insert the end of the plate 30 in the cross-member 11 and to lock them by means of the slider 20, in a manner which is conceptually similar to what has been described above.

The shape of the protrusions 32 can be changed extensively, without altering the concept that they are engaged by the slot of the slider 20 in order to stably couple the cross-member 11 to the pin element, which in the specific case is constituted by the plate 30.

With reference to FIGS. 18 to 21, in order to better couple and guide the slider with respect to the cross-member, a cross-member, designated by the reference numeral 11a, is provided having a longitudinal slot 40 wherein a tab 41 is slidingly accommodated, said tab protruding radially towards the inside of the slider, designated by the reference numeral 20a.

From the above description it is thus evident that the invention achieves the intended aim and objects and in particular the fact is stressed that the provision of a quick-coupling device, in which the cover can be fixed to the water closet simply by quickly shifting two sliders, allows to remove the cover from the water closet in order to perform cleaning and sterilization operations without having to extract the threaded posts that connect the pins to the water closet, as instead occurs in the devices according to the prior art.

The above-described device is also particularly simple from a structural point of view and is such as to always ensure stable coupling.

The invention thus conceived is susceptible of numerous modifications and variations, all of which are within the scope of the inventive concept.

All the details may also be replaced with other technically equivalent elements.

Thus, for example, the slider 20, instead of being movable, can be rotated about the cross-member 11 and can have a slot with a wider end which allows to extract the head 7 and a narrow part which engages the groove 8, preventing uncoupling.

In practice, the materials employed, as well as the contingent shapes and dimensions, may be any according to requirements.

What is claimed is:

1. A quick-coupling device, for applying a cover to a water closet, comprising:

pin elements which are fixable to the water closet;

shaped heads each provided at an end of a body part of each one of said pin elements;

a cross-member having a linear longitudinal extension for joining a seat and a lid of the cover;

seats mutually distally arranged on said cross-member and having a shape adapted to be engageable by said shaped heads of each of said pin elements; and locking means for detachably locking said shaped heads of said pin elements in said seats, said locking means comprising sliders which are slidably movable on said cross-member in the direction of said linear longitudinal extension of said cross-member between a locking position in which said sliders engage said shaped heads of said pin elements for locking said shaped heads in said seats of said cross-member, and a non-locking position in which said sliders are arranged distally and non-engaging with said shaped heads so that said shaped heads may be inserted into and removed from said seats.

2. The quick-coupling device according to claim 1, further comprising a groove provided on each one of said pin elements, said groove tapering with respect to a remaining body part of the pin element.

3. A quick-coupling device according to claim 2, wherein said sliders are provided with edges, said edges being insertable in said groove.

4. The quick-coupling device according to claim 3, wherein said sliders have a longitudinal slot delimited by said edges insertable in said groove.

5. The quick-coupling device according to claim 3, comprising rotation prevention means for preventing rotation of said sliders about said cross-member.

6. A quick-coupling device according to claim 5, wherein said rotation prevention means comprise a radial ridge protruding longitudinally on said cross-member and being insertable between flaps of said sliders, said flaps forming said slot.

7. A quick-coupling device according to claim 5, wherein said rotation prevention means are provided at the cross-member, said cross-member having a shaped transverse cross-section and said sliders having a complementary shape to the transverse cross-section of said cross-member.

8. A quick-coupling device according to claim 3, comprising, on said cross-member, a longitudinal slot and a tab, said tab protruding towards an inside part of said sliders and slidingly engaging said slot.

9. The quick-coupling device according to claim 3, wherein said slider is rotatable about a longitudinal axis of said cross-member and has a slot lying circumferentially, said slot further having a wider portion, which allows passage of said shaped head, and a narrower portion, for engaging said tapered groove.

10. The quick-coupling device according to claim 3, wherein said sliders are arranged inside a region delimited by hinges for connecting the seat and the lid.

11. The quick-coupling device according to claim 3, wherein each one of said sliders is arranged in a region delimited between a hinge for connecting the seat and a binge for connecting the lid.

12. A quick-coupling device according to claim 2, wherein said locking means is provided directly by said cross-member, and wherein said cross-member is rotatable about a longitudinal axis thereof and has said seats which are slotted seats for engaging, upon rotation thereof, the tapered groove of said head.

13. A quick-coupling device according to claim 1, wherein said pin elements have a plate-shaped body, and include protrusions forming said shaped heads located proximate to said end which is detachably lockable at the corresponding shaped seats formed on said cross-member and engageable by said sliders of said locking means.

14. A quick-coupling device according to claim 13, wherein said protrusions forming said shaped heads are formed on mutually opposite faces of said plate-shaped body.

15. A quick-coupling device, for applying a cover to a water closet, comprising:

pin elements which are fixable to the water closet;

shaped heads each provided at an end of a body part of each one of said pin elements;

a cross-member having a liner, longitudinal extension for joining a seat and a lid of the cover;

seats mutually distally arranged on said cross-member and having a shape adapted to be engageable by said shaped heads of each of said pin elements; and locking device for detachably locking said shaped heads of said pin elements in said seats, said locking device comprising sliders which are slidably movable on said cross-member in the direction of said linear longitudinal extension of said cross-member between a locking position in which said sliders engage said shaped heads of said pin elements for locking said shaped heads in said seats of said cross-member, and a non-locking position in which said sliders are arranged distally and non-engaging with said shaped heads so that said shaped heads may be inserted into and removed from said seats.

16. The quick-coupling device according to claim 15, further comprising a groove provided on each one of said pin elements, said groove tapering with respect to a remaining body part of the pin element.

17. The quick-coupling device according to claim 16, wherein said sliders are provided with edges, said edges being insertable in said groove.

18. The quick-coupling device according to claim 17, wherein said sliders have a longitudinal slot delimited by said edges insertable in said groove.

19. The quick-coupling device according to claim 17, comprising a rotation prevention device for preventing rotation of said sliders about said cross-member.

\* \* \* \* \*